United States Patent [19]

Swank et al.

[11] Patent Number: 4,544,955

[45] Date of Patent: Oct. 1, 1985

[54] IMPLOSION RESISTANT CATHODE RAY TUBES

[75] Inventors: Harry R. Swank, Liverpool, N.Y.; Fred F. Doggett, Daytona Beach, Fla.; Lee E. Huyler, N. Syracuse; Santo J. Sofia, Syracuse, both of N.Y.

[73] Assignee: General Electric Company, Portsmouth, Va.

[21] Appl. No.: 575,137

[22] Filed: Jan. 30, 1984

[51] Int. Cl.[4] .......... H04N 5/65

[52] U.S. Cl. .......... 358/246; 358/245; 358/247; 220/2.1 A

[58] Field of Search .......... 358/245, 246, 247; 220/2.1 A, 2.3 A

[56] References Cited

U.S. PATENT DOCUMENTS

| | | | |
|---|---|---|---|
| 3,845,530 | 11/1974 | Platt | 358/246 |
| 3,890,464 | 6/1975 | Hill et al. | 220/2.1 A |
| 3,904,820 | 9/1975 | Bongenaar | 220/2.1 A |
| 3,912,105 | 10/1975 | Eisses et al. | 220/2.1 A |
| 4,169,274 | 9/1979 | Larson et al. | 220/2.1 A |
| 4,432,018 | 2/1984 | Futatsudera | 358/246 |

*Primary Examiner*—Howard W. Britton
*Assistant Examiner*—John K. Peng

[57] ABSTRACT

A cathode ray tube implosion resistant rimband bonding system having soft, flexible, compliant adhesive surfaces which dampens the propagation of cracks through the rimband portion of the tube.

6 Claims, 3 Drawing Figures

IMPLOSION RESISTANT CATHODE RAY TUBES

BACKGROUND OF THE INVENTION

This invention relates to cathode ray tubes and, more particularly, to methods and structure for resisting implosion within cathode ray tubes.

Cathode ray tubes being relatively large evacuated glass envelopes are subject to implosion when cracked or fractured. Implosion of such tubes can result in scattering of chucks and splinters of glass.

In recent years, advances in implosion restraint have employed tension bands about certain critical portions of the envelope as fracture restraining means to provide the implosion protection. Color envelopes include a panel joined to a funnel member by ceramic frit, while monochrome envelopes are usually flame sealed together. It has been known for some time that if cracks can be contained in the face of the tube, the tube envelope will devacuate safely rather than implode. The prior art suggests a number of techniques for enhancing the resistance to fracture of cathode ray tube envelopes.

One technique disclosed in U.S. Pat. No. 4,169,274 provides for a pair of substantially U-shaped flat rimbands, each having a reinforcing ridge, encircling the skirt portion of the face plate member, with a forward edge intermediate the mold line and jointure of the skirt. and the window portion. A tension strap is applied intermediate the forward edge and the reinforcing ridge of the rimbands. This approach also discloses, underlying the rimbands, the use of a fiber reinforced tape member with a single adhesive surface in contact with the glass envelope.

Another technique disclosed in U.S. Pat. No. 3,456,076 provides a single tension band about the skirt of the face plate panel with an adhesive tape member having a single adhesive surface in contact with the skirt of the face plate underlying the tension band. Compressive forces are applied to the skirt and tape member to reduce implosion danger of the tube envelope. According to this approach, a variety of adhesive tapes can be utilized, the longitudinal strength of the tape being reinforced by compressive forces of the tension band.

Yet another technique disclosed in U.S. Pat. No. 3,845,530 utilizes a pair of metal rim plates contoured to encircle a tube with the inner surface thereof carrying a non-tacky coating of a tackifiable adhesive. The adhesive is tackified just prior to assembly and caused to adhere to the glass through curing and pressure.

Yet a further technique disclosed in U.S. Pat. No. 3,220,593 utilizes one or more annular bands placed around the tube envelope in the non-viewing perimetrical region of the tube face plate at its substantially maximum exterior cross-sectional dimensions. In using this approach, a hard adhesive such as synthetic or epoxy resin is employed to form a cured and hardened bond between the band or bands and the glass tube.

SUMMARY OF THE INVENTION

In accordance with the present invention, an improved arrangement for rendering cathode ray tube envelopes resistant to implosion is provided.

The novel method and structure for rendering the cathode ray tube envelope resistant to implosion according to the present discovery incorporates a composite having soft flexible adhesive surfaces on both sides thereof to bond with rimbands on one side and on the other side to the skirt portion of the tube's faceplate member. The composite in a preferred embodiment comprises a tape with adhesive on both sides thereof.

By tying the skirt portion of the faceplate member to the rimband member in this manner, a dampening effect is created whereby the bonding force between both the tape and the glass and the tube and the rimband, as well as the integral strength of the tape and the compressive force and mass inertial effects of the hardware, must be overcome for cracks to propagate to the rear of the tube envelope. By tying these elements together in a flexible mode, the rimband must be physically displaced along its entire length if enough expansion is to occur to allow crack propagation. Because the rimband is physically bonded to the glass by a flexible bonding agent, cracks cannot shear the bond as readily over smaller areas, as occurs with stiff tapes and resins with a high degree of plasticity, to allow propagation of cracks. Because the rimband is bonded along its entire length, movement of the glass to adhesive and adhesive to rimband interfaces is impeded much more than with previous methods because of the reinforcement of the tape fibers and the inertial effects of the rimband member resulting in slower speeds.

In the flexible bonding arrangement, bonding at one surface to the rimband member and at the other surface to the glass, along with the reinforcement of the tape fabric, provides a greater holding power or strength across a crack when a crack appears. As a crack develoops or propagates, because of the flexible nature of the bonding material, the material is stretched across the crack opening without shearing the bond to the glass surface in the areas directly adjacent the crack. As a result of the surface being bonded substantially to one entire side of each rimband as well as the glass, glass expansion to allow crack propagation at the interface is inhibited. This combined action dampens or inhibits further crack propagation in the glass.

As a result of this slow crack propagation, implosion test results are noticeably improved. Specifically, it has been observed that cracks are less numerous and extensive, and rimband buckling, which usually occurs when other techniques are used, has not been noticed.

An additional advantage afforded by the use of a soft flexible adhesive, according to the present invention, is the removability and salvageability of the tube from which the tape is removed. Rimbands, according to the present invention, can be removed from the tube without special means and without pulling or shearing portions of glass during the removal process. Other harder adhesives of the prior art or adhesives which cure over time, or with heat or pressure, cannot be safely removed from the glass envelope without special heating or soak treatment methods to lessen the adhesion to the glass.

DETAILED DESCRIPTION

Figure 1:
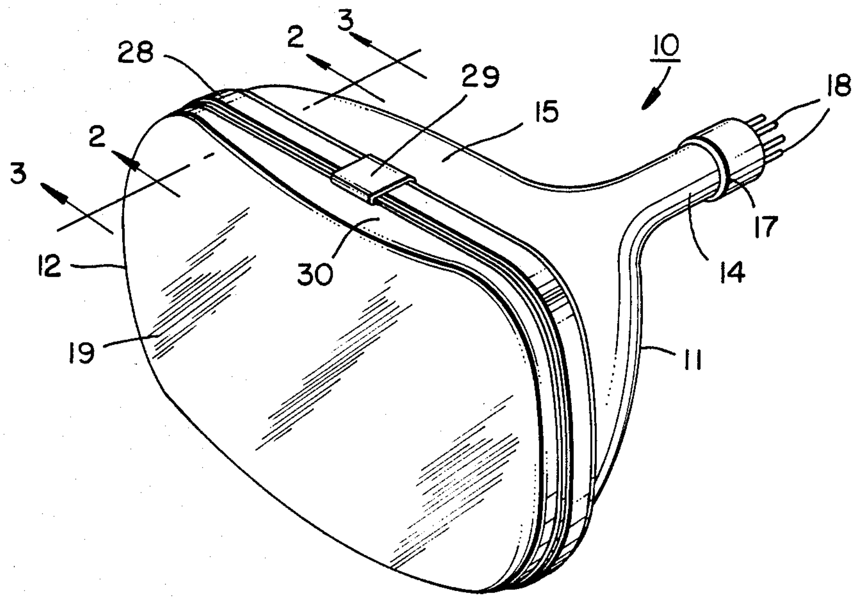
FIG. 1 is a perspective view of a cathode ray tube envelope employing the elements of the present invention.

Referring to the drawing, a cathode ray tube 10 is illustrated which incorporates a preferred embodiment of the present invention. As illustrated therein, cathode ray tube 10 includes a funnel member 11 having a neck portion 14 integral with a flared portion 15.

A faceplate member 12 having a viewing portion or window 19 includes an integral and rearwardly extending flange or skirt member 20 which extends around the periphery of viewing window 19. Faceplate member 12 is joined to the flared portion 15 of funnel member 11 at a seal line 21 at the reward edge of skirt member 20. Electron gun(s) (not shown) are located within the neck portion 14 and connected to conductors 18 via a base 17. The interior of the sealed cathode ray tube envelope is evacuated to a high level of vacuum resulting in large atmospheric pressures being exerted against the exterior portions of the tube envelope 10.

Figure 2:
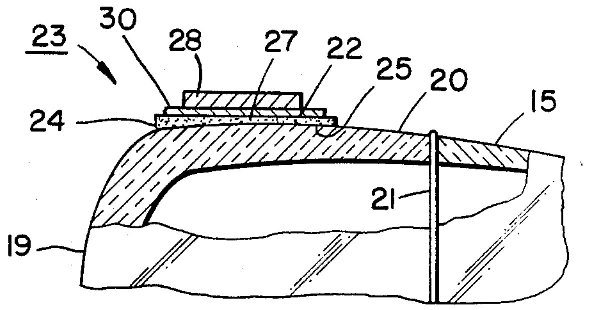
FIG. 2 is an enlarged fragmentary cross sectional view of a portion of the tube envelope of FIG. 1, taken along the line 2—2, and illustrating one embodiment of an adhesive member of the present invention.
Figure 3:
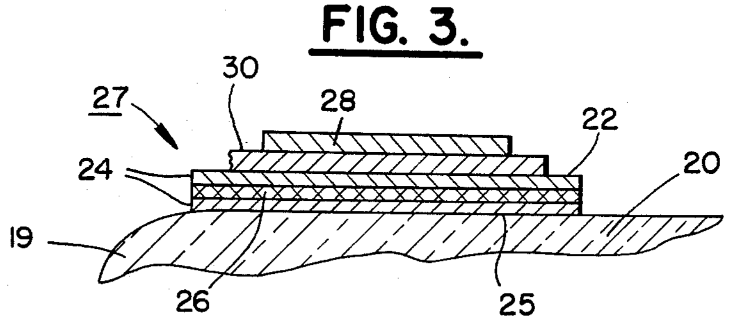
FIG. 3 is a further enlarged fragmentary cross sectional view of a portion of the tube envelope of FIG. 1, taken along the line 3—3, and illustrating another embodiment of adhesive member of the present invention.

The implosion resisting structure 23 of the present invention, as illustrated in FIGS. 1, 2 and 3, may be assembled in the following manner. Composite 27 having a member 26 and adhesive material 24 with adhesive surfaces 22 and 25 on opposite sides thereof is applied about the skirt portion 20 of the face plate member 12. Adhesive material 24 includes, according to the invention, backing material 26 located intermediate the two adhesive surfaces 22 and 25 to provide both longitudinal strength and lateral stability to the composite 27. In a preferred embodiment, composite 27 comprises a tape having adhesive material on both faces thereof. Optionally, backing material 26 may comprise a flexible, cure resistant and/or fiberous material such as cotton cloth.

A rimband member 30 comprising a high tensile strength steel overlays the skirt portion 20 of the face plate member 12 with the composite 27 therebetween. Rimband 30 may be constructed in multiple parts, for example in a preferred embodiment, two pieces, to facilitate ease in assembly. Tensile stresses are applied to a tension band 28 to compress the rimband 30 which further compresses the composite 27 and the backing material 26 in a compacted, sandwiched relationship between the rimband 30 and the skirt portion 20 to form a soft, flexible, adhesive bond between the rimband 30 and the skirt portion 20 of the tube envelope 10. As will be understood, this arrangement provides an effective method of retarding the speed of crack propagation in the tube envelope 10. Tension band 28 is held in the surrounding and tensioned position by means of clip member 29.

Composite 27 may comprise any suitable, soft, flexible, conformable material which readily adheres at one surface or interface 25 to the glass of the skirt portion 20 of envelope 10 and at the other surface or interface 22 to the metal rimband 30. It has been found that a layer of soft adhesive between approximately 0.012 and 0.016 inches thick on each side of the backing material is preferred. This order of thickness produced good results by avoiding discontinuities by being thick enough to fill voids, but thin enough with sufficient flow characteristics to allow a gradual tapered edge of the adhesive/glass/rimband interface.

One such suitable adhesive material is manufactured and sold by the Permacel Corporation under the designation P-50 tape. The P-50 tape 27 comprises heavy, cure resistant high tack rubber adhesive surfaces 22 and 25 on both sides of an extremely durable flexible cloth backing material 26. The cloth backing material provides excellent strength in both the longitudinal and lateral directions and superior conformability.

With the use of the soft, flexible, adhesive material 24 and adhesive surfaces 22 and 25 on both sides of the tape 27, the rimband 30 is bonded to the skirt 20 of the faceplate member 12. By tying the skirt portion 20 to the rimband 30 in this manner, a dampening effect is created.

The flexible bonding arrangement, bonded at one surface 22 to the rimband 30 and at the other surface 25 to the glass 20, provides a greater holding power or strength across a crack when a crack appears. As a crack develops or propagates, because of the flexible nature of the bonding material, the material is stretched across the crack opening without shearing the bond to the glass surface in the areas directly adjacent the crack. As a result of the surface 22 being bonded to the rimband 30, stretch across the crack at the glass interface 25 is inhibited. This combined action dampens or inhibits further crack propagation in the glass.

For cracks to propagate to the rear of the tube, the bonding force of the composite 27 between both the glass and the rimband must be overcome as well as the compressive force on the tube and the strength of the backing material between the two adhesive surfaces. By tying these components together in a flexible and conformable, adhesive mode, the rimband must be physically moved along its entire length if sufficient expansion is to occur to permit crack propagation.

Because the rimband is physically bonded to the glass by a flexible adhesive bonding member, cracks cannot split or shear the bond in small areas to permit rapid propagation of cracks. Because the rimband 30 is bonded along its entire length, movement of the glass to adhesive surface 25 and rimband to adhesive surface 22 is much less than in prior arrangements. This results in much slower crack propagation than with prior bonding methods. As a result of this slow crack propagation, implosion test results, especially with tubes having a diagonal measurement greater than 19 inches, are noticeably improved.

Soft adhesives are preferred in accordance with the invention because of their flexibility to deflect and comply with forces placed on them. On the otherhand, hard adhesives, which tend to be cured materials, exhibit little deflection when subject to high forces. They characteristically hold up to a certain force and then crack due to their brittle nature. After cracking, there is little or no holding strength across the crack to impede the progress of cracks in the tube.

Furthermore, the use of a soft adhesive with backing material 26 is more foregiving of folds and other discontinuities that may occur as the member is being applied to the tube. Such discontinuities are reduced because of the compliant nature of the adhesive and assembly of the member is generally an easier task. On the other hand, when using a tape with hard adhesives, great care must be taken to assure that the tape is applied without folds therein which is a time-consuming task.

With the present, soft, flexible composite 27, rimbands can be safely removed from the tube without damage to the glass in the removal process. In contrast, it is noted, many other adhesives presently in use cannot be safely removed from tubes without special treatment and/or without damage.

The bonding system disclosed herein is useful in many types of cathode ray tubes including those used in television sets. It is useful in all sizes of such tubes and particularly advantageous in tubes having diagonal measurements greater than 19 inches.

The disclosures of all the aforesaid patents are hereby incorporated by reference in their entireties herein. It should be understood that the above described embodiment of the invention is illustrative only and that modifications thereof may occur to those skilled in the art. Accordingly, this invention is not to be regarded as limited to the embodiment disclosed herein, but is to be limited only as defined by the appended claims. In addition, while the tape may be applied as a composite 27 as described above, the novel structure of the present invention may be produced by the following method. A first layer of soft, flexible adhesive material is applied about the surface of the skirt portion of the faceplate, a flexible backing material is applied to the first layer of the soft, flexible adhesive material. A second layer of soft, flexible adhesive material is applied over the backing material, and a rimband is laid over the skirt portion of the faceplate, the backing material and the first and second layers of soft, flexible adhesive material. The bonds between the rimband member and the skirt portion dampen movement of the skirt portion and the rimband member at the adhesive surfaces which dampening of movement retards the speed of crack propagation in said tube.

The steps of applying the first layer, the backing material and the second layer may be accomplished before the overlying step so as to form the composite 27 described hereinabove as a result of the first three steps and then overlying the skirt with said composite. The composite and tensile stresses may be removed from the skirt position without the necessity of tackifying the adhesive in the composite.

We claim:

1. A cathode ray tube comprising:

a funnel member having a neck portion and a flared portion;

a faceplate member having a viewing portion and a rearwardly extending skirt portion, said skirt portion being joined to said flared portion of said funnel member;

an adhesive member having a flexible, fiberous backing material with first and second layers of soft, flexible, cure resistant adhesive material on opposite sides thereof;

a rimband member overlaying the skirt portion of said faceplate member with one adhesive surface of said adhesive member in contact with and adhering to said rimband member and with the other adhesive surface of said adhesive member in contact with and adhering to said skirt portion;

means for applying tensile stresses to said rimband member about said skirt portion and said adhesive member to compress said adhesive member between said rimband member and said skirt portion to form soft, flexible adhesive bonds between said rimband member and said skirt portion;

said soft, flexible adhesive bonds dampening the movement of said skirt portion and said rimband member at said adhesive surfaces which dampening of movement retards the speed of crack propagation in said tube and said fiberous backing material imparting lateral and longitudinal stability to said adhesive bond interfaces upon crack propagation.

2. The cathode ray tube of claim 1 in which said adhesive member comprises a tape of heavy duty, highly conformable, cure resistant high tack adhesive on both sides of a flexible cloth backing.

3. A cathode ray tube comprising:

a funnel member having a neck portion and a flared portion;

a faceplate member having a viewing portion and a rearwardly extending skirt portion, said skirt portion being joined to said flared portion of said funnel member;

an adhesive tape having a cloth backing material and first and second adhesive surfaces of soft, flexible, cure resistant adhesive material on opposite sides thereof;

a rimband member located about the skirt portion of said faceplate member with one adhesive surface of said tape in contact with and adhering to said rimband member and with the other adhesive surface of said tape in contact with and adhering to said skirt portion;

means for applying tensile stresses to said rimband member about said skirt portion and said tape between said rimband member and said skirt portion to form soft, flexible adhesive bonds between said rimband member and said skirt portion; and, said soft, flexible adhesive bonds dampening the movement of said skirt portion and said rimband member at said adhesive surfaces which dampening of movement retards the speed of crack propagation in said tube and said cloth backing material imparting lateral and longitudinal stability to said adhesive bond interfaces upon crack propagation.

4. A method of retarding the speed of crack propagation in the skirt portion of the faceplate of a cathode ray tube comprising:

applying a first layer of soft, flexible, cure resistant adhesive material about the surface of the skirt portion of said faceplate;

applying a flexible, fiberous backing material to said first layer of said soft, flexible adhesive material;

applying a second layer of soft, flexible, cure resistant adhesive material over said backing material;

overlaying the skirt portion of said faceplate, said backing material and said first and second layers of soft, flexible adhesive material with a rimband member; and, applying tensile stresses to said rimband member to compress said backing material between said adhesive layers, said skirt portion and said rimband member to form soft, flexible adhesive bonds between said rimband member and said skirt portion to dampen movement of said skirt portion and said rimband member at said adhesive surfaces which dampening of movement retards the speed of crack propagation in said tube and to form a reinforcement by means of said fiberous backing material between said soft flexible adhesive layers which imparts lateral and longitudinal stability to said adhesive bond interfaces upon crack propagation.

5. The method of claim 4 wherein the steps of applying the first layer, the backing material and the second layer is accomplished before the overlying step so as to form a composite as a result of the first three steps and then overlaying the skirt with said composite.

6. The method of claim 5 further including the step of removing the composite and tensile stresses from said skirt portion without the necessity of tackifying the adhesive in the composite.

* * * * *